US006954980B2

(12) United States Patent  (10) Patent No.: US 6,954,980 B2
Song  (45) Date of Patent: Oct. 18, 2005

(54) PANEL-SECURING SYSTEM FOR VARIOUS VEHICLE TYPES (75) Inventor: Ji-Myeon Song, Asan (KR)

(73) Assignee: Hyundai Motor Company, Seoul (KR)

( * ) Notice: Subject to any disclaimer, the term of this patent is extended or adjusted under 35 U.S.C. 154(b) by 585 days.

(21) Appl. No.: 10/162,167

(22) Filed: Jun. 3, 2002

(65) Prior Publication Data

US 2003/0051328 A1 Mar. 20, 2003

(30) Foreign Application Priority Data

Jul. 11, 2001 (KR) .......................... 2001-41608

(51) Int. Cl.[7] .............................................. B23P 11/00
(52) U.S. Cl. .......................... 29/714; 29/705; 29/715; 29/721; 29/281.1; 29/281.6; 29/407.1; 29/464; 29/466; 29/468; 29/559
(58) Field of Search .......................... 29/705, 714, 715, 29/721, 281.1, 281.6, 33 K, 897.32, 407.09, 407.1, 434, 464, 466, 468, 559

(56) References Cited

U.S. PATENT DOCUMENTS

| 4,535,927 A | * | 8/1985 | Matsubara et al. | .......... 228/6.1 |
| 4,589,184 A | * | 5/1986 | Asano et al. | .......... 29/430 |
| 4,767,046 A | * | 8/1988 | Kumagai et al. | .......... 228/4.1 |
| 4,779,336 A | * | 10/1988 | Inoue et al. | .......... 29/799 |
| 4,944,445 A | * | 7/1990 | Zimmer | .......... 228/102 |
| 4,960,969 A | * | 10/1990 | Shigenaka | .......... 219/91.2 |
| 5,150,506 A | * | 9/1992 | Kotake et al. | .......... 29/407.05 |
| 5,796,615 A | * | 8/1998 | Madaraishi et al. | .......... 700/109 |
| 6,065,200 A | * | 5/2000 | Negre | .......... 29/430 |
| 6,122,813 A | * | 9/2000 | Roy et al. | .......... 29/407.09 |
| 6,293,454 B1 | * | 9/2001 | Zhang et al. | .......... 228/4.1 |
| 6,322,063 B1 | * | 11/2001 | Steinhart | .......... 269/152 |
| 6,591,485 B2 | * | 7/2003 | Cappa et al. | .......... 29/714 |

FOREIGN PATENT DOCUMENTS

| JP | 02-208183 | 8/1990 |
| JP | 5-29636 | 9/1991 |
| JP | 08-020369 | 1/1996 |
| JP | 08-324468 | 10/1996 |
| JP | 2001-157936 | 12/2001 |

* cited by examiner

Primary Examiner—Eric Compton
(74) Attorney, Agent, or Firm—Morgan Lewis & Bockius LLP (57) ABSTRACT A panel-securing system for various vehicle types is provided, in which various clamps and fingers for different panel shapes may be selected for operation by a single cylinder, the amount of space utilized to install the system is minimized, and parts used in the system are simplified. The panel-securing system for use in a production line for various vehicle types comprises a controller having stored therein panel information for various vehicle types, the controller generating and outputting a locator-selection control signal and a panel-securing control signal corresponding to panel information of the correct vehicle type; a first actuator for selecting a locator corresponding to the locator-selection control signal output by the controller; a second actuator for driving a locator corresponding to the panel-securing control signal output by the controller; and a panel-securing assembly including a plurality of locators, which correspond to panels of the various vehicle types.

14 Claims, 9 Drawing Sheets

PANEL-SECURING SYSTEM FOR VARIOUS VEHICLE TYPES

FIELD OF THE INVENTION

The present invention relates to a panel-securing system for use in vehicle assembly lines, and more particularly, to a panel-securing system for various vehicle types.

BACKGROUND OF THE INVENTION

There are various types of securing systems used in vehicle assembly lines. For example, there is a mechanical securing system that uses clamps and fingers, and a suction-securing system that uses vacuum. In the case of the mechanical securing system, since the panels of doors and other such parts are not typically formed with flat surfaces, only a minimal securing area is available. Therefore, stable securing of panels is difficult. Also, because the position of the door panel is altered following the securing operation, the door panel must be put back into its original position, which is a difficult process.

Figure 1:
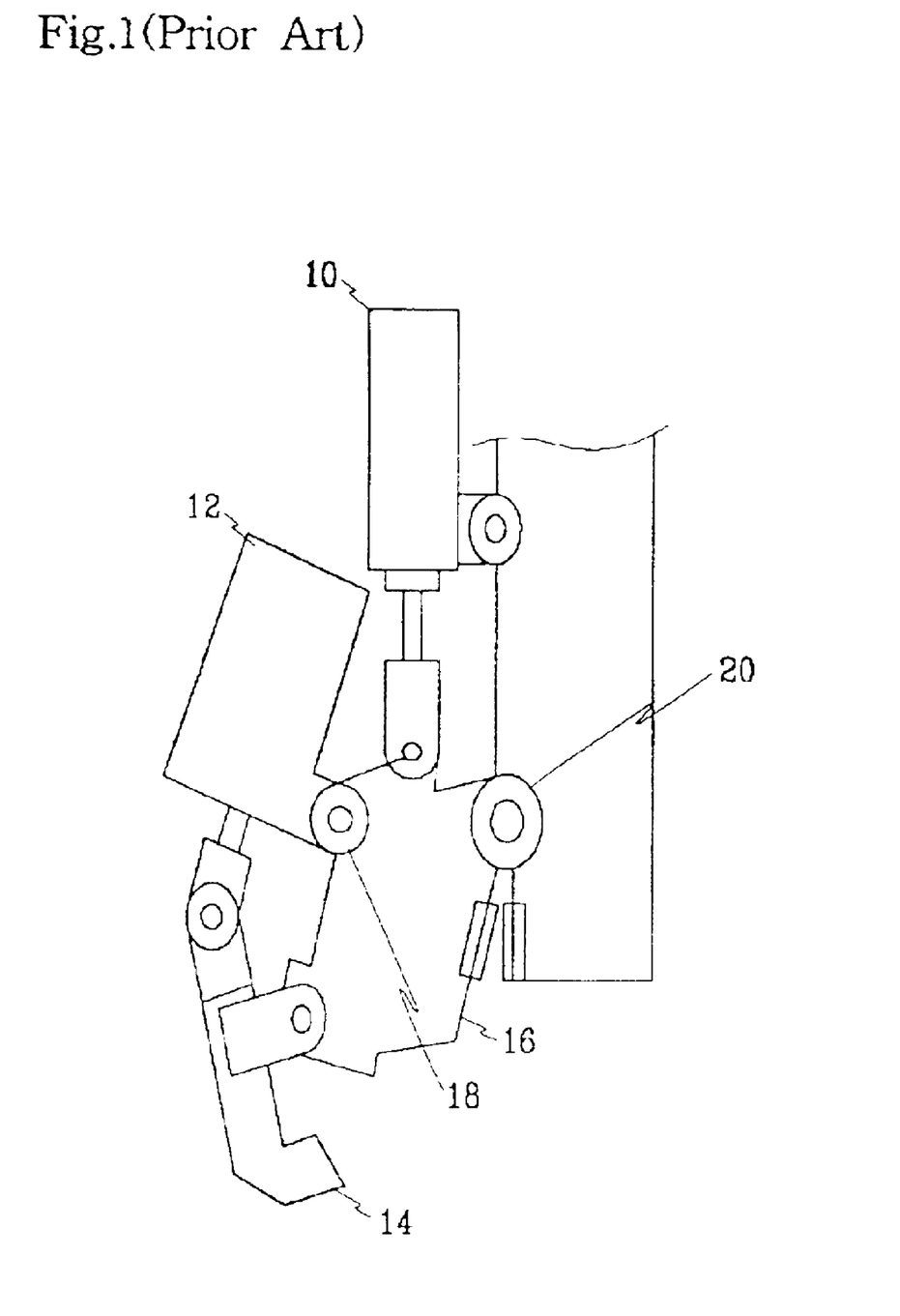
FIG. 1 is a schematic view of a conventional panel-securing system for various vehicle types.

As shown in FIG. 1, a conventional panel-securing system includes a jig-rotating cylinder 10, a clamp cylinder 12, a clamp 14, and a locator 16. Reference numerals 18 and 20 refer to a first hinge and a second hinge, respectively. In an initial state of the conventional panel-securing system, all jigs are reversely rotated by the release of the clamp 14, resulting from the reverse positioning of the clamp cylinder 12 and by the shortening of the jig-rotating cylinder 10.

Figure 2:
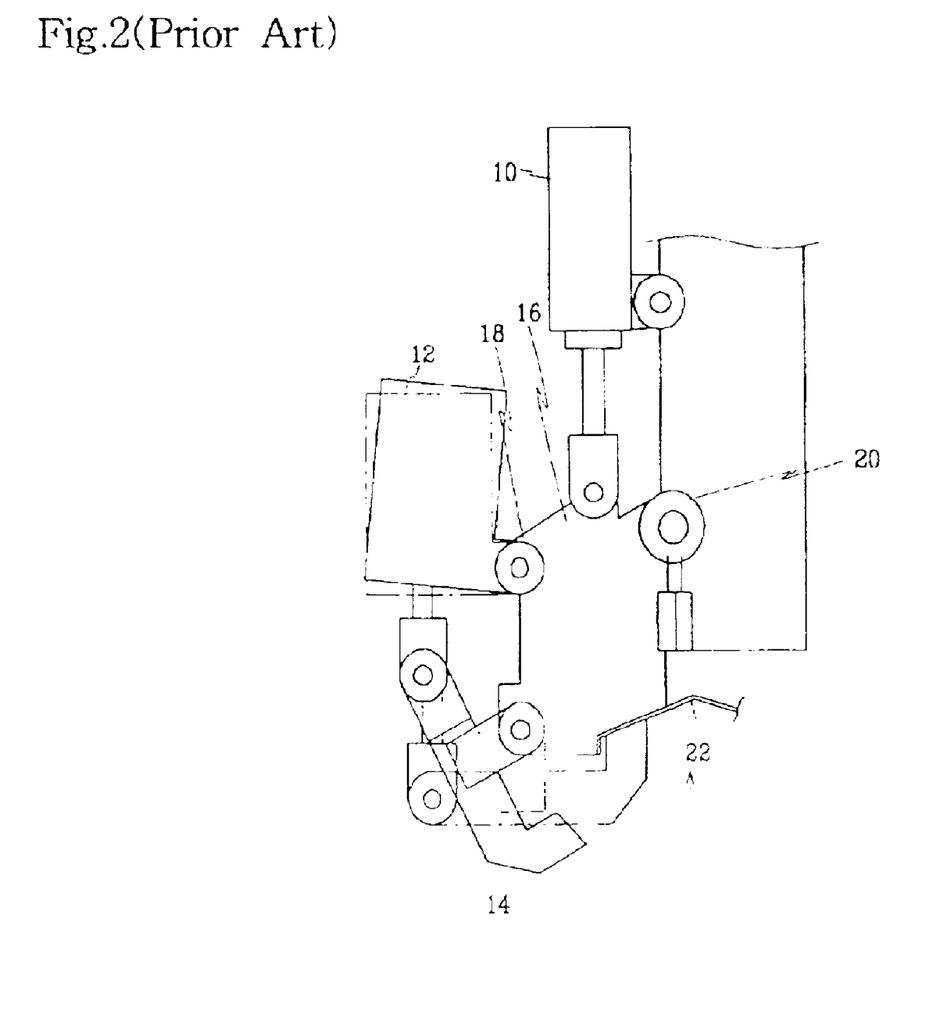
FIG. 2 is a schematic view of the panel-securing system of FIG. 1 in operation.

In the case where a panel 22 of vehicle type A is handled, jigs of vehicle type A are advanced by the elongation of the jig-rotating cylinder 10. With reference to FIG. 2, when the clamp cylinder 12 is operated, the clamp 14 approaches the panel 22. With the continuing advancement of the clamp cylinder 12, the clamp 14 locks onto the panel 22, and the panel 22, secured between the clamp 14 and the locator 16, is transported to a desired location.

Figure 3:
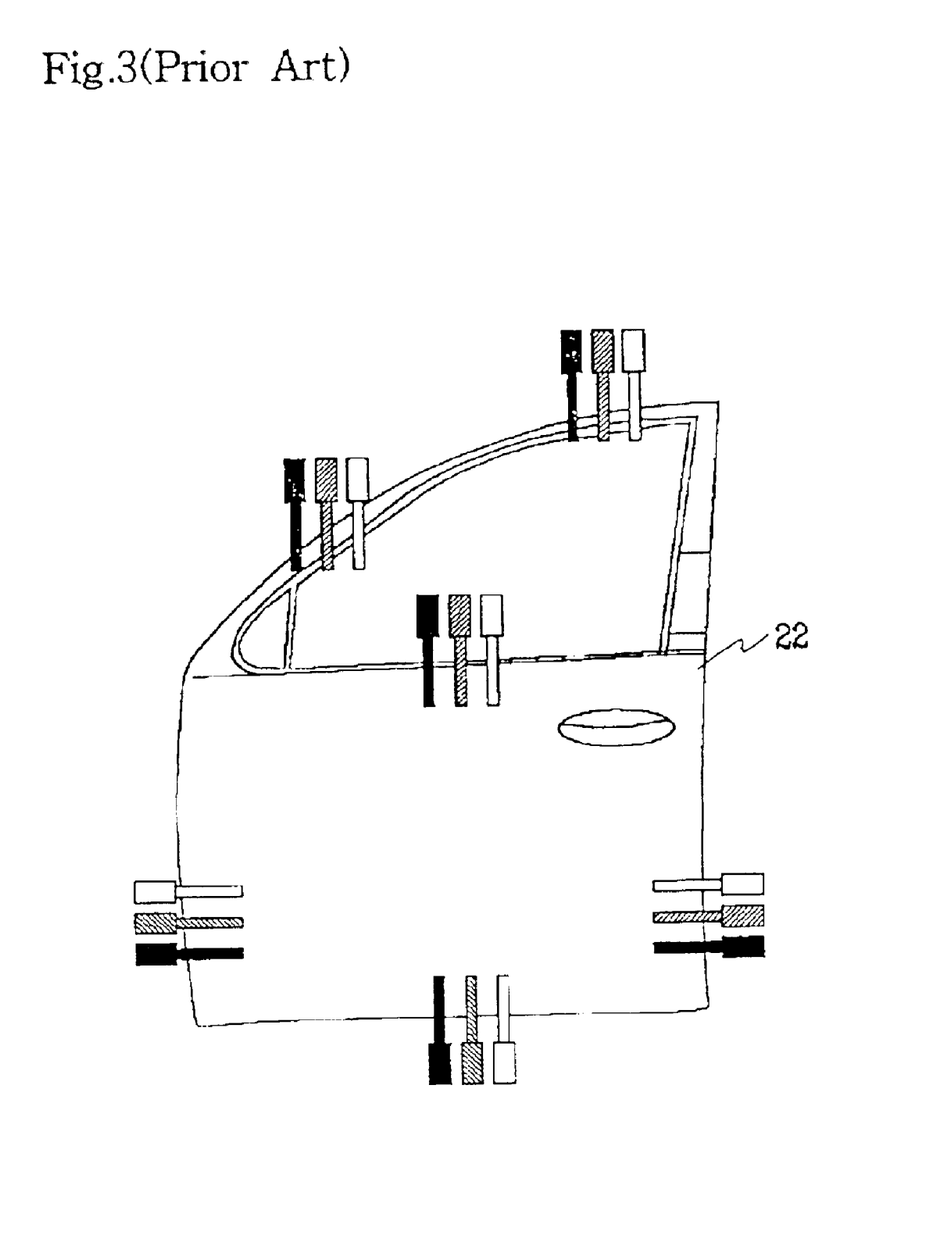
FIG. 3 is a schematic view showing the placement of a variety of conventional panel-securing systems to enable operation on a specific number of vehicle types.

In the case of a handling jig mounted on a conventional robot arm or overhead loader, a variety of jigs must be installed in each location in order to secure various panels of differing shapes. A rotating structure therefore must be implemented to prevent interference between the panel and jig. As a result, the overall structure becomes complicated and the assembly has significant weight. For example, in the case of a handling jig used in a door line of an assembly process that produces three different types of vehicles, three different types of jigs must be provided at each master control point as shown in FIG. 3.

It is therefore necessary, with the conventional panel-securing system for various vehicle types, to use a different set of clamps and fingers for every type of vehicle, as well as separate cylinders to drive the clamps and fingers. The large number of clamps, fingers and cylinders increases overall manufacturing cost and requires crowding of parts into small areas. Further, a shut-down period is required when changing vehicle type so that changes in the securing system can be made. Finally, the conventional panel-securing system is slow in operation as a result of its increased weight, thereby slowing the overall production process.

SUMMARY OF THE INVENTION

The present invention provides a panel-securing system for various vehicle types in which various clamps and fingers for different panel shapes may be selected for operation by a single activator, such as a cylinder. According to a preferred embodiment, a panel-securing system for use in a production line for various vehicle types comprises a controller, a panel-securing assembly and first and second actuators. The controller has stored therein panel information for various vehicle types. The controller generates and outputs a locator-selection control signal and a panel-securing control signal corresponding to panel information of the correct vehicle type. The panel-securing assembly includes a plurality of locators, which correspond to panels of the various vehicle types. The first actuator selects a locator corresponding to the locator-selection control signal output by the controller. The second actuator drives a locator corresponding to the panel-securing control signal output by the controller.

In an alternative embodiment of the present invention, a panel securing system includes a plurality of panel locators with each locator having a locating portion configured and dimensioned to mate with a specific panel type. The locating portion is formed on a locator body and defines a hole therethrough, including an indexing notch. A rotatable first shaft passes through the panel holes. An indexing clamp is disposed on the shaft and translatable along the shaft in response to rotation thereof. A second shaft surrounds the first shaft and defines a longitudinal groove with the indexing clamp extending through the groove. The indexing clamp is positionable in a specific indexing notch in response to rotation of the first shaft in order to select a specific panel locator. The selected panel locator is then actuatable via the indexing clamp in response to rotation of the second shaft. Preferably the rotatable first shaft comprises a lead screw. Also, biasing elements acting on the panel locators to bias the locators against the second shaft may be provided.

In a further preferred alternative embodiment, the system further includes a servo motor cooperating with the first shaft to rotate the first shaft and a hydraulic cylinder and linkage cooperating with the second shaft to rotate the second shaft. An electronic control unit may be provided to control the servo motor and hydraulic cylinder based on panel selection and actuation signals.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 4:
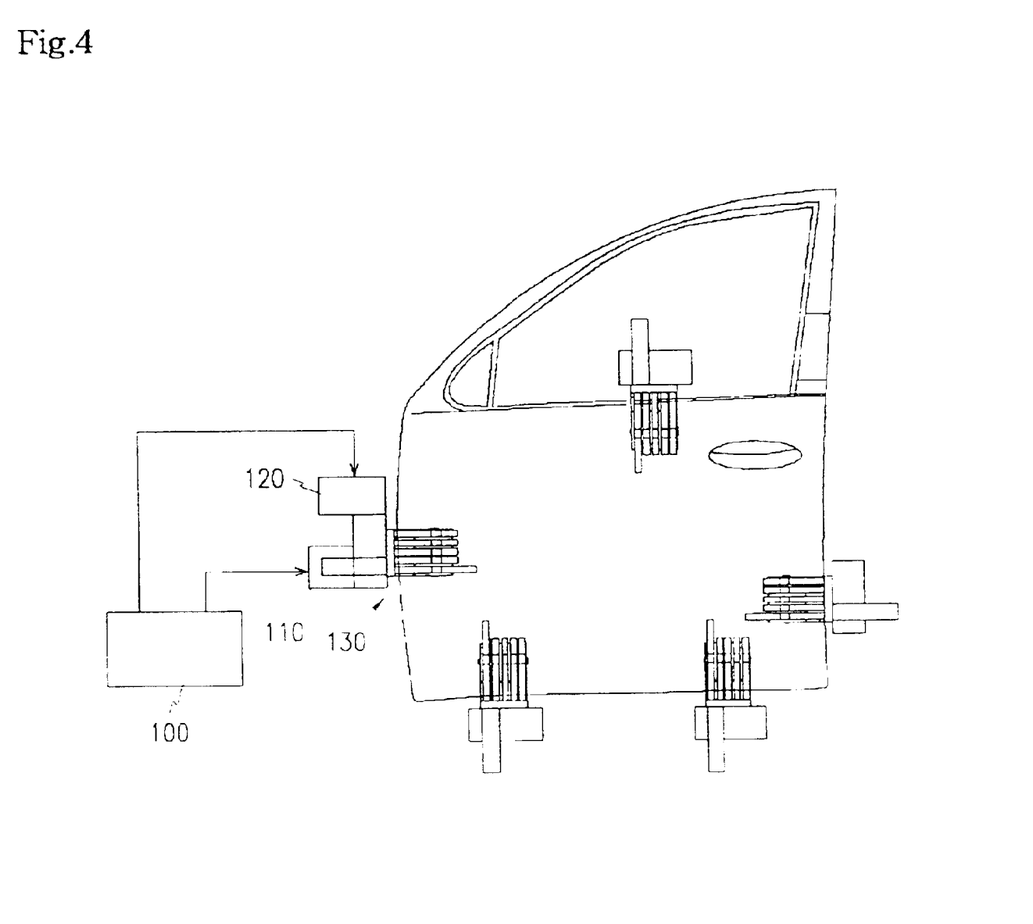
FIG. 4 is a schematic view illustrating mounting positions of a panel-securing system for various vehicle types according to a preferred embodiment of the present invention.
Figure 5:
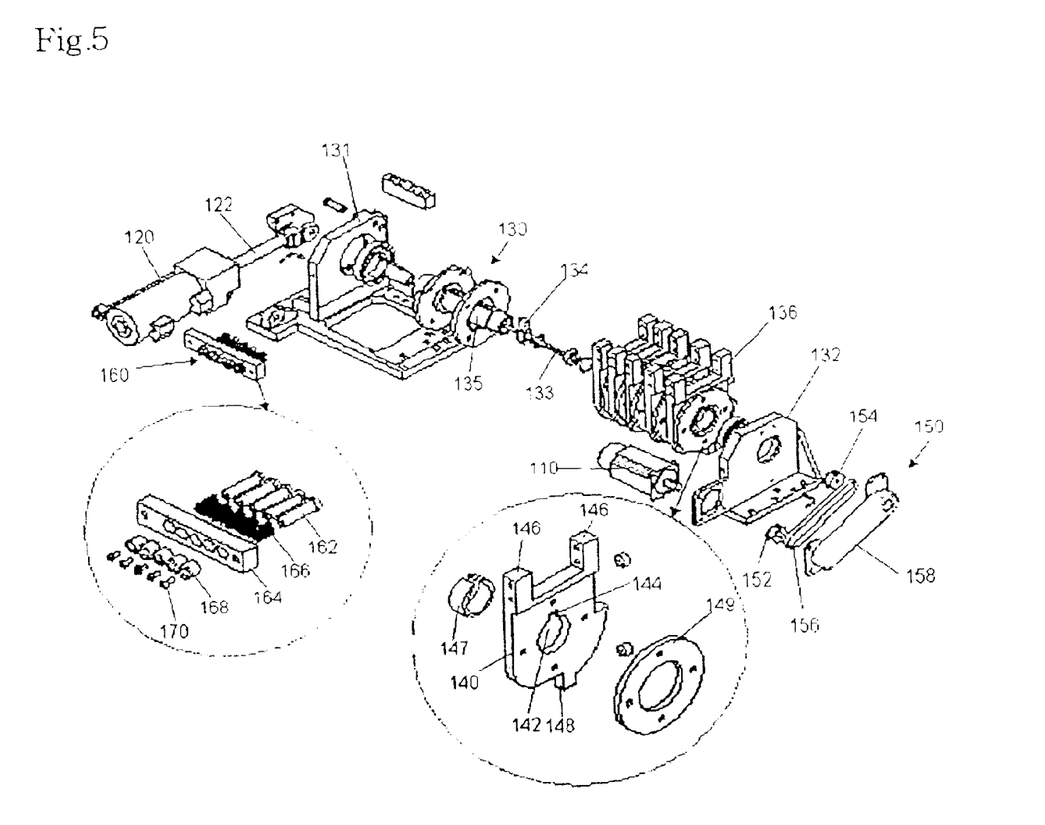
FIG. 5 is an exploded perspective view of a panel-securing system for various vehicle types according to a preferred embodiment of the present invention.
Figure 6:
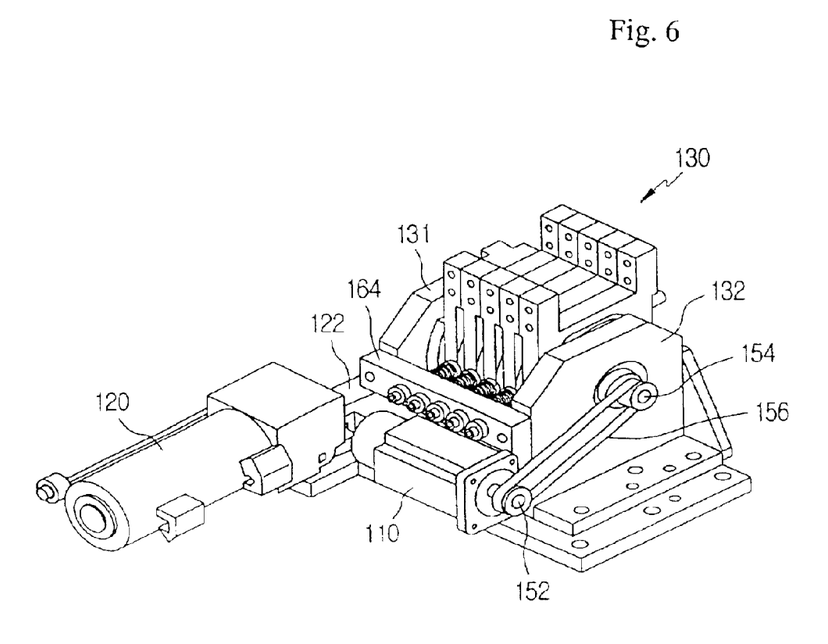
FIGS. 6–8 show different perspective views of the panel-securing system of FIG. 5 in an assembled state.
Figure 7:
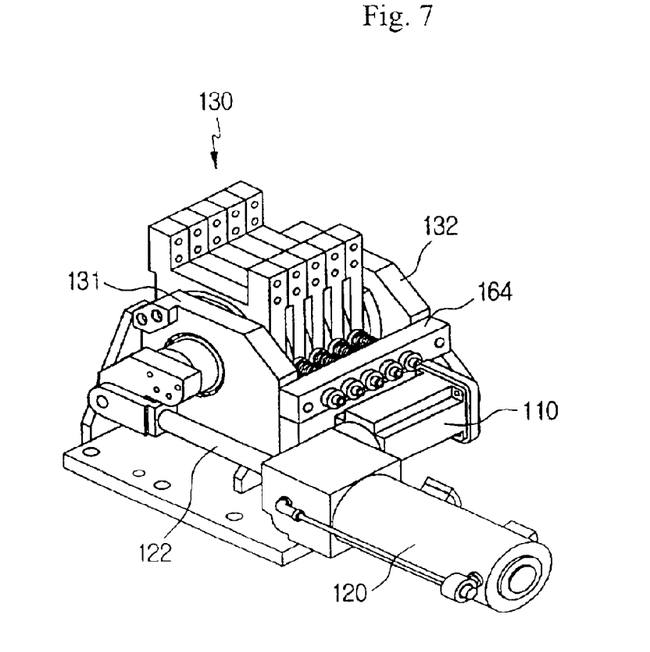
Figure 8:
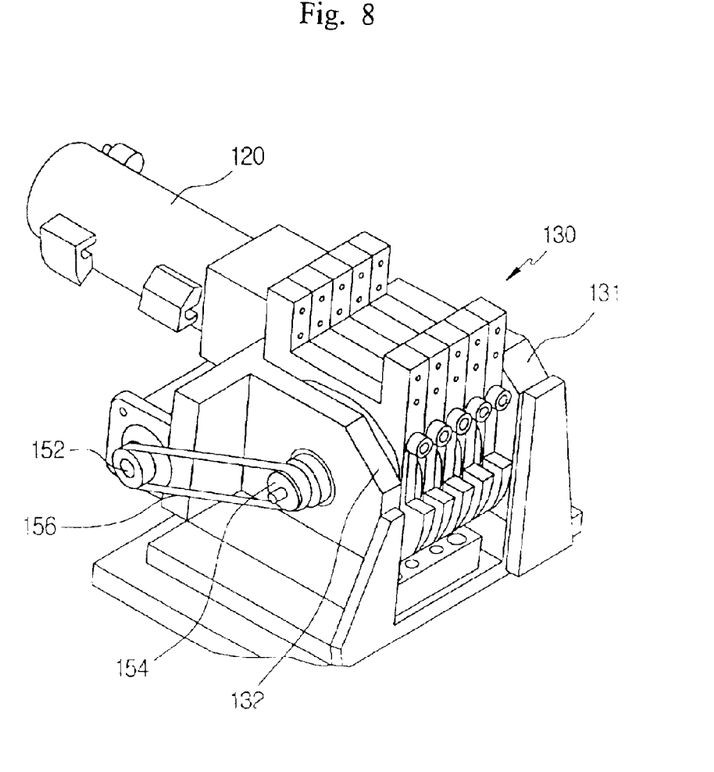
Figure 9:
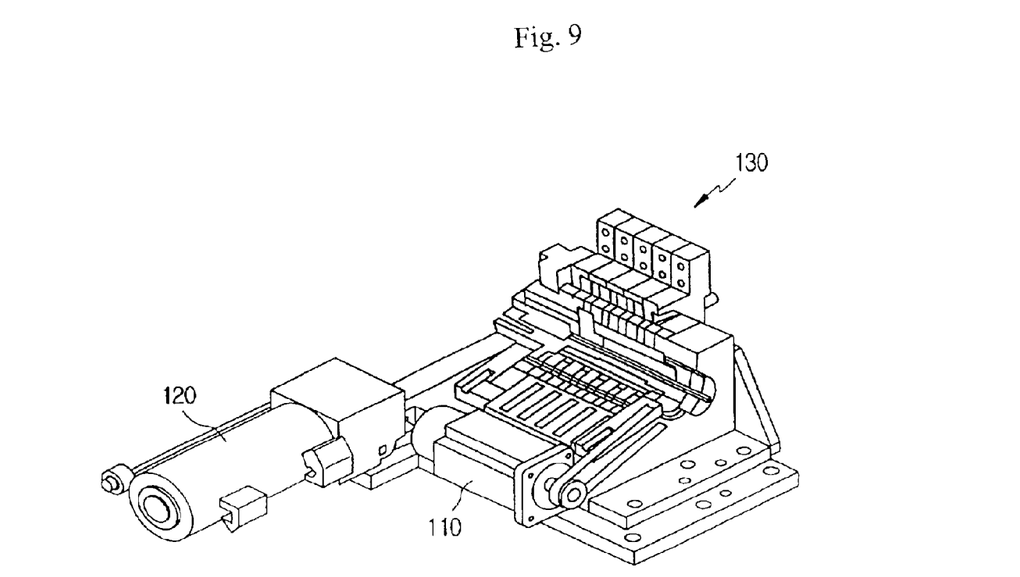
FIG. 9 is a partially disassembled perspective view of the panel-securing system of FIGS. 6–8 used to describe a connection between a clamp and a locator.
Figure 10:
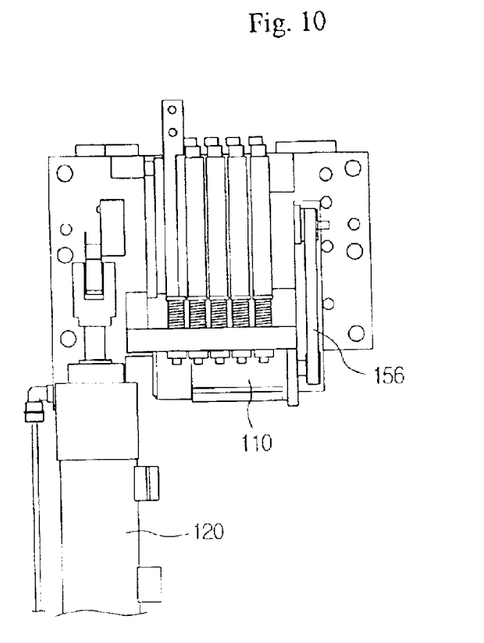
FIG. 10 is a partially disassembled perspective view of the panel-securing system of FIGS. 6–8 used to describe a connection between a locator and an elastic element.
Figure 11:
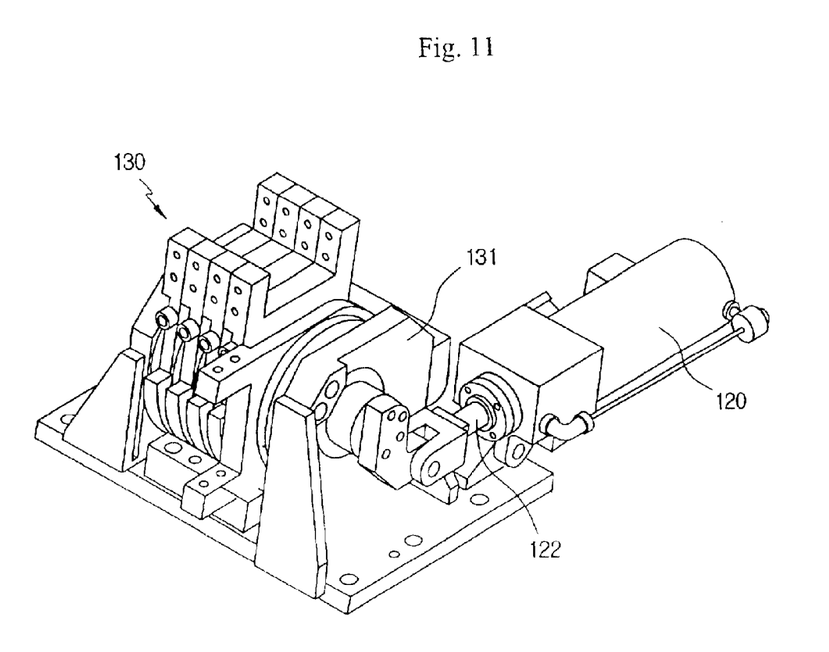
FIG. 11 is a schematic perspective view of the panel-securing system of FIG. 5 in an assembled state showing the operation of a locator corresponding to the driving of the panel-securing system.

Referring to FIGS. 4 and 5, a system for securing a panel for various vehicle types in a vehicle production line according to a preferred embodiment of the present invention includes a controller 100, a first actuator 110, a second actuator 120, and a panel-securing assembly 130.

The controller 100 has stored therein panel information regarding various vehicle types, and, using this information, performs overall control of the panel-securing system. In particular, the controller 100 generates a locator-selection control signal and a panel-securing control signal corresponding to panel information for the correct vehicle type. In addition, the controller 100 preferably includes a separate memory portion, in which there is stored panel information according to vehicle type. The controller 100 may be a microprocessor and may use a server or a typical personal computer in the assembly line.

The first actuator 110 selects a locator (shown in FIG. 5) that corresponds to the panel information supplied by the locator-selection control signal received from the controller 100. The first actuator 110 comprises a servomotor having a rotating spindle. The second actuator 120 drives the locator corresponding to the panel-securing control signal received from the controller 100. The second actuator 120 comprises a hydraulic cylinder having a rod 122 that undergoes rectilinear motion during operation.

As shown in FIG. 5, the panel-securing assembly 130 includes a plurality of locators 136 corresponding to panels of various vehicle types. The assembly cooperates with the first and second actuators 110 and 120 such that the locator corresponding to the panel information is driven. The panel-securing assembly 130 includes a main body frame 131 and an auxiliary body frame 132, a first shaft 133, a clamp 134, a second shaft 135, and locators 136. There are as many locators 136 as there are a number of vehicle types that are applied to the production line. In a preferred embodiment of the present invention, there are five locators 136 to handle five different vehicle types.

The second actuator 120 is mounted to the main body frame 131 and the first actuator 110 is mounted to the auxiliary body frame 132. The main body frame 131 and the auxiliary body frame 132 are connected, preferably by bolts. That is, the auxiliary body frame 132 is placed on an extended portion of the main body frame 131 and bolted thereon.

The first shaft 133 comprises a ball screw mechanism wherein the lead screw is rotated by the first actuator 110. The clamp 134 is driven linearly along the axis of first shaft 133 by the lead nut in response to rotation of the first shaft 133. Clamp 134 may be formed as part of or separate from the lead nut. Rotation of first shaft 133 causes the clamp to be linearly positioned in association with a selected locator based on the panel information from controller 100. Clamp 134, driven by second shaft 135 as explained below, then rotates together with the selected locator 136. Hence, the clamp 134 functions to actuate the locators 136. In a preferred embodiment of the present invention, clamp 134 acts similarly to a clutch that operates to rotate only the one of the locators 136 that is selected.

The second shaft 135 is preferably substantially cylindrical and is rotated by second actuator 120. Rod 122 of the second actuator 120 is linked to second shaft 135 by a level arm or other substitute linkage such that rectilinear motion of rod 122 rotates the second shaft 135. The first shaft 133 is inserted inside the second shaft 135 along the longitudinal axis thereof, and a groove is formed in the second shaft 135 along the length thereof so that the clamp 134 can protrude past the second shaft 135 to perform its operation.

The locators 136 are connected to the second shaft 135 as described below. Each locator 136 includes a body plate 140 having a mounting hole 142 through which the second shaft 135 passes for mounting thereon. A clamp groove 144 is formed into the body plate 140 in an upper portion of the circumference of the mounting hole 142 (as in FIG. 5). Clamp 134 connects with the clamp groove 144 of the selected locator 136 when moved along the first shaft 133. Panel-securing members 146 are formed extending from an upper portion of the body plate 140. Bushing 147 is inserted in the mounting hole 142, and weight plate 149 is at one side of each body plate 140.

The panel-securing assembly 130 further includes a power transmitter 150. The power transmitter 150 preferably includes a first pulley 152, which is connected to a spindle of the first actuator 110, and a second pulley 154 connected to an end of the first shaft 133. Drive belt 156 cooperates between the first and second pulleys 152 and 154 such that a torsional force of the first actuator 110 is transmitted to the first shaft 133. Reference numeral 158 indicates a cover that protects the drive belt 156.

The panel-securing assembly 130 further includes a position-adjusting member 160. The position-adjusting member 160, in a state where locator 136 is connected to the second shaft 135, applies a predetermined elastic force in a direction toward the locators 136 such that the locators 136 maintain their state of connection to the second shaft 135. The position-adjusting member 160 includes housings 162, a support block 164, elastic elements 166, and guides 168.

Each of housings 162 is mounted to contact to a lower portion of one of the locators 136 when the locators 136 are mounted on the second shaft 135. Housings 162 are cylindrical and hollow, and one end of housings 162 is closed. The closed ends of each housing have a larger diameter than the rest of the housings. Also, screw threads are formed on an inner surface of housings 162.

The support block 164 is connected to the body frames 131 and 132 of the panel-securing assembly 130 in a direction substantially parallel to the first shaft 133. The support block 164 is preferably hexahedral and includes holes into which housings 162 are inserted.

Elastic elements 166 are provided between the housings 162 and the support block 164. Elastic elements 166 are preferably compression coil springs. Housings 162 are inserted within the elastic elements 166 with one end of elastic elements 166 abutted against the closed ends of each housing 162, and opposite ends of the elastic elements 166 abutted against the support block 164. The elastic elements 166 act to fix the locators 136 in a horizontal direction.

Guides 168 are inserted into the holes formed in the support block 164, and the housings 162 are inserted into the same holes of the support block 164 as described above with the guides 168 interposed therebetween. Bolts 170 are screwed into the threads of the housings 162 such that the housings 162 are secured in their positions within the holes of the support block 164 but are able to undergo sliding motion therein in the longitudinal direction of the housings 162. The guides 168 act to guide the housings 162 during their sliding motion.

Reference numeral 148 of FIG. 5 indicates a protrusion formed at a bottom portion (in the drawing) of the locators 136. In an assembled state, the housings 162 contact the protrusions 148 of the locators 136.

Operation of the panel-securing system according to a preferred embodiment of the present invention will now be described with reference to FIGS. 6-12.

As discussed above, the panel-securing system according to a preferred embodiment of the present invention is structured to select the locators 136 using a single actuator. The selected locator 136 is then operated using a different actuator. A swing operation of one of the locators 136 corresponding to vehicle type, information of which is received from the controller 100, will first be described.

Figure 12:
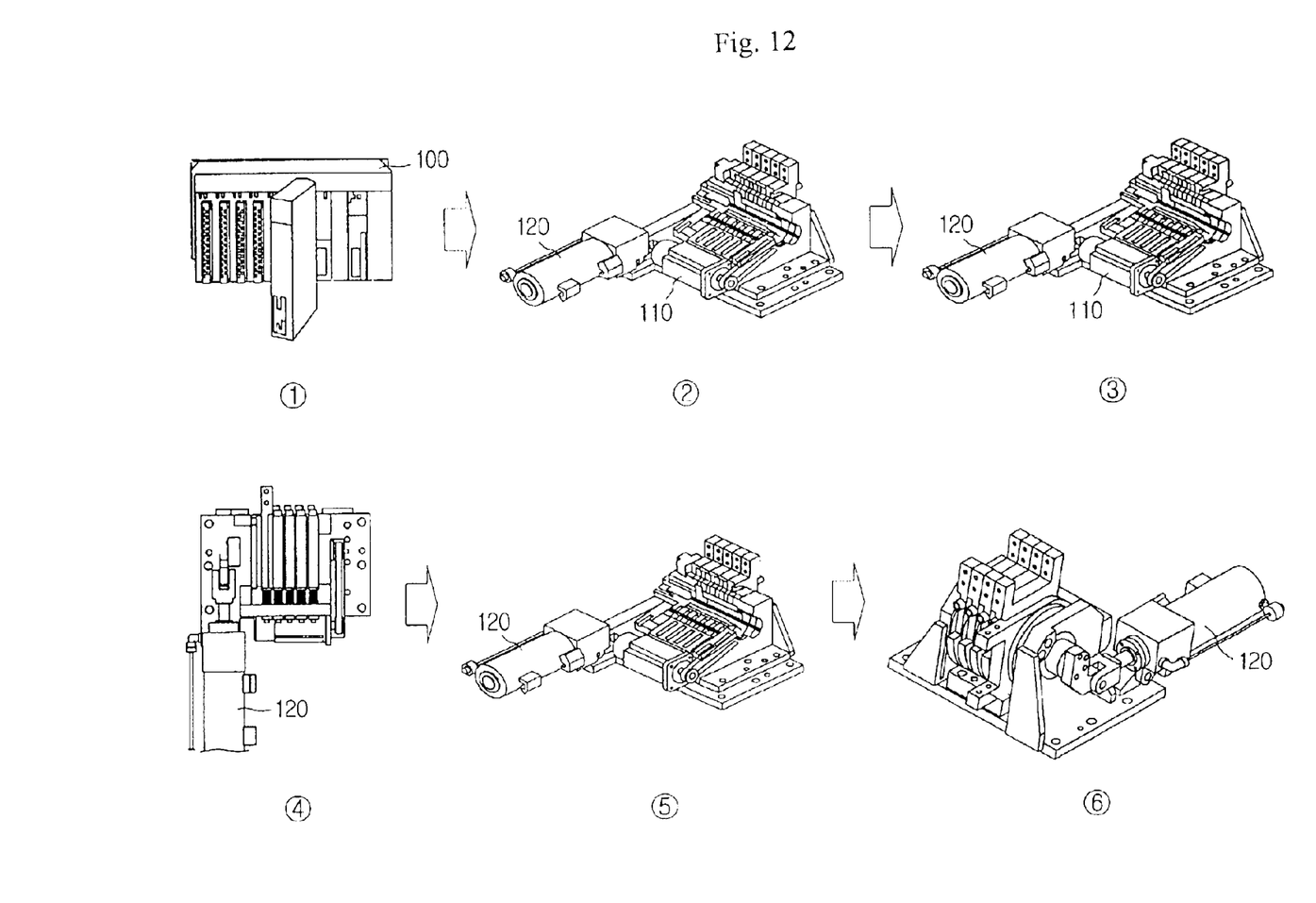
FIG. 12 is a process flow diagram of the operation of a panel-securing system for various vehicle types according to a preferred embodiment of the present invention.

As shown in FIG. 12, the controller 100 supplies a locator-selection control signal to the first actuator 110 (servo motor) in step 1. Next, the first actuator 110 rotates according to the input of the locator-selection control signal received from the controller 100 in step 2. As a result, the first pulley 152 of the power transmitter 150 rotates by its connection to the first actuator 110, which, in turn, rotates the second pulley 154 via the drive belt 156.

The first shaft 133 then rotates through its connection to the second pulley 154. Therefore, the clamp 134 is moved along the first shaft 133. The distance that the clamp 134 moves is controlled by the locator-selection control signal supplied to the first actuator 110. That is, the first actuator 110 rotates by an amount corresponding to the locator-selection control signal, and the clamp 134 moves along the first shaft 133 according to the degree to which the first actuator 110 rotates. As a result, the clamp 134 comes to be positioned at the locator 136 corresponding to the locator-selection control signal and connection between the clamp 134 and the clamp groove 144 occurs, thereby completing locator selection in step 3.

In this state, a panel-securing control signal is supplied to the second actuator 120 from the controller 100 such that the second actuator 120 is operated in step 4. With the operation of the second actuator 120, the rod 122 of the second actuator 120 is extended such that the second shaft 135 undergoes rotation in step 5. This results in the rotation of the locator 136 connected to the clamp 134 in step 6. Hence, only the locator corresponding to the panel of the correct vehicle type is selected and operated such that the securing of panels of various vehicle types is possible.

With the use of the panel-securing system for various vehicle types of the present invention described above, it becomes unnecessary to stop the production line for the changing of jigs since the securing system may be used for multiple types of panels. Also, the number of jigs is reduced and the jig parts are made simpler such that overall production is simplified and panel-securing is made more efficient.

Further, because the number of cylinders is reduced, the cost and weight of the panel-securing system are significantly reduced, and maintenance is required less frequently.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A panel-securing system for use in a production line for various vehicle types comprising:
    a controller having stored therein panel information for various vehicle types, the controller generating and outputting a locator-selection control signal and a panel-securing control signal corresponding to panel information of a selected vehicle type;
    a panel-securing assembly including a plurality of panel locators, including different locators each corresponding to panels of the various vehicle types;
    a first actuator for selecting a locator corresponding to the locator-selection control signal output by the controller; and
    a second actuator for driving said locator corresponding to the panel-securing control signal output by the controller.

2. The panel-securing system of claim 1, wherein the first actuator comprises a servo motor that includes a rotating spindle.

3. The panel-securing system of claim 1, wherein the second actuator comprises a hydraulic cylinder including a rod that undergoes rectilinear motion during operation.

4. The panel-securing system of claim 1, wherein the panel-securing assembly comprises:
    a body frame;
    a first shaft linked to an operation of the first actuator to undergo rotational motion, the first actuator being mounted to one side of the body frame;
    a clamp linked to the rotational motion of the first shaft to undergo motion along the first shaft in a longitudinal direction of the first shaft; and
    a second shaft into which the first shaft is inserted in a longitudinal direction of the second shaft, the second shaft being linked to the operation of the second actuator to undergo rotational motion,
    wherein the locators are mounted on the second shaft.

5. The panel-securing system of claim 4, wherein the panel-securing assembly further comprises a power transmitter, the power transmitter including a first pulley connected to a spindle of the first actuator; a second pulley connected to an end of the first shaft; and a drive belt connected between the first and second pulleys such that a torsional force of the first actuator is transmitted to the first shaft.

6. The panel-securing system of claim 4, wherein the panel-securing assembly further comprises a position-adjusting member, the position-adjusting member, in a state where the locators are connected to the second shaft, applying a predetermined elastic force in a direction toward the locators such that the locators maintain their state of connection to the second shaft.

7. The panel-securing system of claim 6, wherein the position-adjusting member comprises:
    cylindrical housings, each of which contacts a predetermined position of one of the locators in a state where the locators are mounted on the second shaft;
    a support block including holes into which the housings are inserted;
    elastic elements providing a predetermined elastic force to the housings in a state where the housings are inserted into the elastic elements; and guides provided in the holes of the support block such that the housings pass through the holes of the support block with the guides interposed between the housings and the support block, the guides acting as a guide for the housings during movement of the housings in a longitudinal direction thereof.

8. The panel-securing system of claim 4, wherein each of the locators comprises:

a body plate having a mounting hole through which the second shaft passes for mounting thereon;

a clamp groove formed into the body plate from a predetermined location of a circumference of the mounting hole, the clamp connecting with the clamp groove of the locator when moving along the first shaft; and panel-securing members formed extending from predetermined locations of the body plate.

9. A panel securing system, comprising:

a plurality of panel locators, each locator having a locating portion configured and dimensioned to mate with a specific panel type, said locating portion being formed on a locator body defining a hole therethrough including an indexing notch;

a rotatable first shaft passing through said panel holes;

an indexing clamp disposed on said shaft and translatable along said shaft in response to rotation thereof; and a second shaft surrounding the first shaft and defining a longitudinal groove with said indexing clamp extending through said groove;

wherein said indexing clamp is positionable in a specific indexing notch in response to rotation of the first shaft to select a specific panel locator and the selected panel locator is actuatable in response to rotation of the second shaft through cooperation between the indexing clamp and indexing notch.

10. The panel securing system of claim 9, wherein said rotatable first shaft comprises a lead screw.

11. The panel securing system of claim 9, further comprising a servo motor cooperating with the first shaft to rotate said first shaft.

12. The panel securing system of claim 11, further comprising a hydraulic cylinder and linkage arm cooperating with the second shaft to rotate said second shaft.

13. The panel securing system of claim 12, further comprising an electronic control unit controlling said servo motor and hydraulic cylinder based on panel selection and actuation signals.

14. The panel securing system of claim 9, further comprising biasing elements acting on said panel locators to bias said locators against the second shaft.

* * * * *